United States Patent
Aradi et al.

(10) Patent No.: US 7,270,063 B2
(45) Date of Patent: Sep. 18, 2007

(54) METHODS AND APPARATUSES FOR REMOVING MERCURY-CONTAINING MATERIAL FROM EMISSIONS OF COMBUSTION DEVICES, AND FLUE GAS AND FLYASH RESULTING THEREFROM

(75) Inventors: Allen A. Aradi, Richmond, VA (US); Michael W. Meffert, Chesterfield, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 10/991,203

(22) Filed: Nov. 16, 2004

(65) Prior Publication Data

US 2006/0102057 A1  May 18, 2006

(51) Int. Cl.
*F23J 15/00* (2006.01)
(52) U.S. Cl. ..................... 110/345; 423/210
(58) Field of Classification Search ........... 110/210, 110/345, 342, 106, 187, 186; 423/210
See application file for complete search history.

(56) References Cited

U.S. PATENT DOCUMENTS

| | | | |
|---|---|---|---|
| 4,552,076 A * | 11/1985 | McCartney | ......... 110/347 |
| 6,206,685 B1 * | 3/2001 | Zamansky et al. | ......... 431/4 |
| 6,521,021 B1 * | 2/2003 | Pennline et al. | ......... 95/134 |
| 6,790,420 B2 | 9/2004 | Breen et al. | |
| 2001/0007647 A1 | 7/2001 | Honjo et al. | |
| 2003/0143128 A1 | 7/2003 | Lanier et al. | |
| 2003/0147793 A1 | 8/2003 | Breen et al. | |
| 2005/0147549 A1 * | 7/2005 | Lissianski et al. | ......... 423/210 |

FOREIGN PATENT DOCUMENTS

EP  1570894  9/2005

* cited by examiner

*Primary Examiner*—Kenneth Rinehart
(74) *Attorney, Agent, or Firm*—John H. Thomas, P.C.

(57) ABSTRACT

A method of removing mercury or mercury-containing material from flue gas produced by a coal-burning main furnace includes feeding coal, which contains mercury or mercury-containing material, to a main furnace which produces flue gas. The method further includes feeding the coal to an auxiliary burner which produces a slipstream of flyash, feeding the slipstream of flyash from the auxiliary burner into the flue gas produced by the main furnace, and introducing a mercury-active oxidant to the coal being fed to the auxiliary burner, the combustion air fed to the auxiliary burner, and/or the flyash.

17 Claims, 1 Drawing Sheet

METHODS AND APPARATUSES FOR REMOVING MERCURY-CONTAINING MATERIAL FROM EMISSIONS OF COMBUSTION DEVICES, AND FLUE GAS AND FLYASH RESULTING THEREFROM

TECHNICAL FIELD

The present disclosure relates to the removal of mercury-containing material from emissions of combustion devices. More particularly, the disclosure is directed to methods and apparatuses for removing mercury-containing material from emissions of combustion devices and to the flue gas resulting from the removal of mercury-containing material.

BACKGROUND

Conventional coal-fired combustion devices produce emissions that include pollutants such as mercury. Mercury vapor is a poison of the nervous system, with chronic mercury poisoning having potentially dire consequences. Mercury poisoning can at times be fatal and has the characteristic of being cumulative over years of exposure, as the body's nervous system has difficulty in purging this element. At the levels common in the atmosphere, the concentrations of mercury are usually safe. However, mercury can accumulate in lakes, rivers, streams, or the like as a result of rainfall. The mercury can then be ingested by fish, ducks, and other wildlife. This wildlife can be destroyed by the mercury poisoning, or the wildlife, with organic mercury molecules in them, can be hazardous to individuals who eat them. Some conventional systems attempt to control mercury emissions with particulate collection devices.

Mercury (elemental symbol Hg) is a metal that melts at 234K (−38° F.) and boils at 630K (674° F.). As such, it can be expected to have a high vapor pressure relative to many metals. However, the oxidized forms $Hg^{++}$ and $Hg^{+}$ have much lower vapor pressures and can be captured by flyash particulates. It is much easier to collect the oxidized forms that are attached to particulates with conventional particulate collecting devices than it is to collect elemental mercury (Hg), which can be in its vapor or gaseous form at flue gas temperatures.

Accordingly, some conventional systems inject additives into flue gas to oxidize the mercury prior to collection. However, baghouses, fabric filters, electrostatic precipitators, and other collection devices that are efficient enough to reduce the mercury emissions to levels that may be required are very expensive. Moreover, it is still possible for elemental mercury vapor to escape as a gaseous vapor molecule.

Still other conventional systems utilize activated carbon and other fine particulates to bind or absorb mercury to facilitate removal of oxidized mercury. However, the efficiency of electrostatic precipitators may be diminished by high carbon content in fly ash, which results from the use of activated carbon, and thus baghouses are required to remove carbon-containing particles before the flue gas enters the electrostatic precipitator. Also, flyash having a high carbon content is not sellable, and therefore presents a disposal problem.

Since several states and the United States Environmental Protection Agency will soon limit the emissions of mercury from combustion devices, efficient and cost-effective apparatuses and methods for controlling emissions of mercury are desirable.

SUMMARY OF THE INVENTION

In some aspects, a method of removing mercury or mercury-containing material from flue gas produced by a coal-burning main furnace includes feeding coal, which contains mercury or mercury-containing material, to a main furnace which produces flue gas. The method further includes feeding the coal to an auxiliary burner which produces a slipstream of flyash, feeding the slipstream of flyash from the auxiliary burner into the flue gas produced by the main furnace, and introducing a mercury-active oxidant to the coal being fed to the auxiliary burner, the combustion air fed to the auxiliary burner, and/or the flyash.

In accordance with some aspects, a system for removing mercury or mercury-containing material from flue gas produced by a coal-burning main furnace comprises a supply of coal which contains mercury or mercury-containing material and a coal-burning main furnace configured to receive coal from the supply of coal and to produce flue gas from combustion of the coal. The system may further include an auxiliary burner configured to receive coal from the supply of coal, generate flyash, and direct the flyash to the flue gas of the main furnace and a treatment device configured to introduce a mercury-active oxidant into at least one of the coal being fed to the auxiliary burner, the combustion air being fed to the auxiliary burner, and the flyash.

In some aspects, a method of removing mercury or mercury-containing material from flue gas produced by a coal-burning main furnace comprises feeding coal to an auxiliary burner which produces a slipstream of flyash, generating a slipstream of flyash from the auxiliary burner, feeding the slipstream of flyash into flue gas produced by the main furnace, and introducing a mercury-active oxidant into at least one of the coal being fed to the auxiliary burner, the combustion air being fed to the auxiliary burner, and the flyash.

In various aspects, a flue gas produced by a combustion system fueled by lignite coal, bituminous coal, or subbituminous coal comprises a content of elemental mercury ($Hg^{0}$) which does not exceed about 7.00 µg/dscm.

According to some aspects, a flue gas may be produced by feeding coal which contains mercury or mercury-containing material to a main furnace which produces flue gas, feeding the coal to an auxiliary burner which produces a slipstream of flyash, feeding the slipstream of flyash from the auxiliary burner into the flue gas produced by the main furnace, introducing a mercury-active oxidant to at least one of the coal being fed to the auxiliary burner, the combustion air being fed to the auxiliary burner and the flyash, wherein the mercury and/or the mercury-containing material is at least partially oxidized by the mercury oxidant, and removing oxidized mercury from the flue gas.

In accordance with various aspects, a flue gas may be produced by feeding coal to an auxiliary burner which produces a slipstream of flyash, generating a slipstream of flyash from the auxiliary burner, feeding the slipstream of flyash into flue gas produced by the main furnace, introducing a mercury-active oxidant into at least one of the coal being fed to the auxiliary burner, the combustion air being fed to the auxiliary burner, and the flyash, wherein the mercury and/or the mercury-containing material is at least partially oxidized by the mercury oxidant, and removing oxidized mercury from the flue gas.

In some aspects, a method for increasing mercury content in flyash from a main furnace of a coal combustion system comprises feeding coal which contains mercury or mercury-containing material to a main furnace which produces flue gas, feeding the coal to an auxiliary burner which produces a slipstream of flyash, feeding the slipstream of flyash from the auxiliary burner into the flue gas produced by the main furnace, and introducing a mercury-active oxidant to at least one of the coal being fed to the auxiliary burner, the combustion air being fed to the auxiliary burner, and the flyash. The mercury content of the flyash from the main furnace may be greater than the mercury content of fly ash produced by a coal combustion unit not introducing a slipstream of flyash from an auxiliary furnace into flue gas of a main furnace.

According to various aspects, a method for increasing mercury content in flyash from a main furnace of a coal combustion system comprises feeding coal to an auxiliary burner which produces a slipstream of flyash, generating a slipstream of flyash from the auxiliary burner, feeding the slipstream of flyash into flue gas produced by the main furnace, and introducing a mercury-active oxidant into at least one of the coal being fed to the auxiliary burner, the combustion air being fed to the auxiliary burner, and the flyash. The mercury content of the flyash from the main furnace may be greater than the mercury content of fly ash produced by a coal combustion unit not introducing a slipstream of flyash from an auxiliary furnace into flue gas of a main furnace.

In accordance with some aspects, a system for increasing mercury content in flyash from a main furnace of a coal combustion system includes a supply of coal which contains mercury or mercury-containing material, a coal-burning main furnace configured to receive coal from the supply of coal and to produce flue gas from combustion of the coal, an auxiliary burner configured to receive coal from the supply of coal, generate flyash, and direct the flyash to the flue gas of the main furnace, and a treatment device configured to introduce a mercury-active oxidant into at least one of the coal being fed to the auxiliary burner, the combustion air being fed to the auxiliary burner, and the flyash. The mercury content of the flyash from the main furnace may be greater than the mercury content of fly ash produced by a coal combustion unit not introducing a slipstream of flyash from an auxiliary furnace into flue gas of a main furnace.

DETAILED DESCRIPTION OF EXEMPLARY EMBODIMENTS

Figure 1:
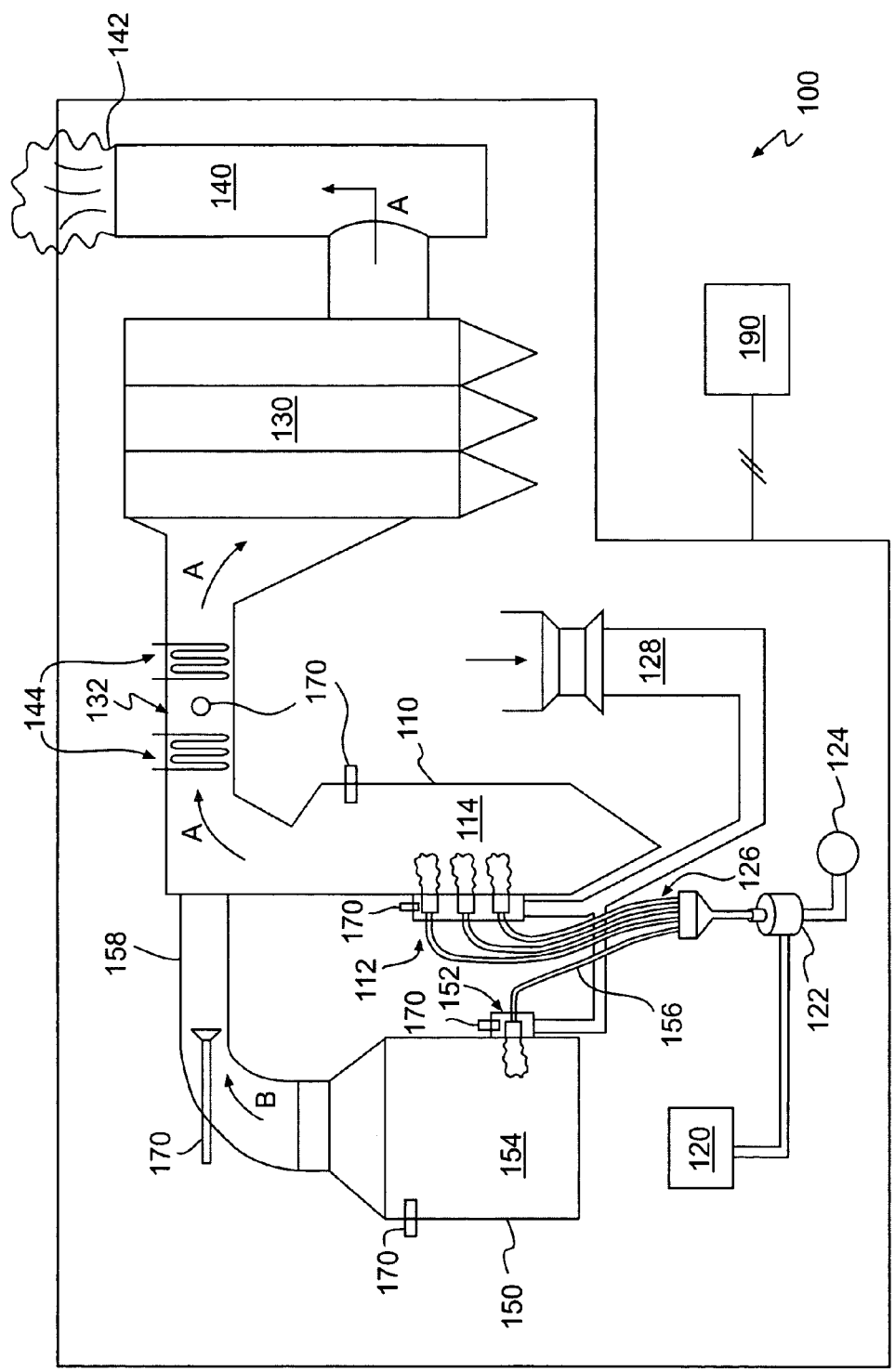
FIG. 1 is a diagrammatic view of an exemplary combustion device in accordance with some aspects of the invention.

An exemplary embodiment of a combustion system is shown in FIG. 1. An exemplary combustion system 100 may include a main furnace 110, an electrostatic precipitator (ESP) 130, and a stack 140. The main furnace 110 may include a plurality of burners 112 and a combustion zone 114. The burners 112 may be located on the front and/or rear walls of the main furnace 110. For clarity and convenience, only three burners 112 are shown in FIG. 1. However, it should be appreciated that the main furnace 110 may include, for example, 24 to 84 burners 112 or any desired number of burners 112.

The combustion system 100 may also include a coal supply 120, a pulverizer 122, and a primary air source 124. Although only one pulverizer 122 is shown in FIG. 1, a plurality of pulverizers may be used, depending on the number of burners and/or the size of the main furnace. The coal supply 120 is structured and arranged to supply coal at a desired rate to the pulverizer 122, and the primary air source 124 is structured and arranged to supply a primary stream of air to the pulverizer 122. The pulverizer 122 grinds the coal to a small size appropriate for burning. The pulverizer 122 is fluidly connected with the burners 112 via line 126.

A secondary air source 128 may provide a secondary air flow to the burners 112. The secondary air source 128 may comprise ambient air from the environment, and the air may be heated with one or more preheaters (not shown) prior to providing the air to the burners 112. Each burner 112 may have an adjustable secondary air register (not shown) to control the flow of air to the respective burner 112.

Each of the burners 112 burns its respective air/fuel mixture in the combustion zone 114 of the main furnace 110. The gaseous by-product of the burners 112 flows in the direction of arrows A out of the main furnace 110, through a flue line 132, through the ESP 132, and into the stack 140, where it is exhausted to the atmosphere at 142. A fan (not shown) may be used to aid the flow of the gaseous by-product in this manner. The gaseous by-product flowing through the flue line 132 may be referred to as flue gas. The flue gas may be used to heat steam and water in convective passes 144, as is known in the art.

The combustion system 100 may further include an auxiliary furnace 150 comprising an auxiliary burner 152 and a combustion zone 154. The pulverizer 122 may be fluidly connected with the auxiliary burner 152 via line 156. As a result, a slipstream of the same coal and air being supplied to the main furnace 110 and burners 112 may be supplied to the auxiliary furnace 150 and auxiliary burner 152.

The secondary air source 128 may provide a secondary air flow to the auxiliary burner 152. The auxiliary burner 152 may have an adjustable secondary air register (not shown) to control the flow of air to the burner 152. The auxiliary burner 152 burns its air/fuel mixture in the combustion zone 154 of the auxiliary furnace 150. The gaseous by-product of the auxiliary burner 152, including flyash, flows in the direction of the arrow B out of the auxiliary furnace 150, through line 158, and into the flue line 132 of the main furnace 110.

The combustion system may include, for example, one or more injection ports 170 for supplying additives to the fuel supply, the combustion air supply, and/or the flyash of the auxiliary and/or the main furnace 110, 150. The additives may include one or more mercury-active oxidants such as, for example, inorganic oxidants, organometallic oxidants, and organic oxidants. Inorganic and organometallic oxidants that are capable of emerging active from a flame front may be introduced to the flame of or upstream of the burner 152 of the main and/or the auxiliary furnace 110, 150. Organic oxidants, which are not flame stable, can be added to the flyash of the auxiliary furnace 150 at an appropriate temperature before the flyash is injected into the flue line 132 or they can be added directly into the flue line 132.

In various embodiments, the inorganic and organometallic oxidants may include compounds of Li, Na, K, Rb, Ca, Sr, Ba, Cr, Mn, Fe, Co, Cu, Y, Zr, Mo, Ru, Rh, Pd, Sn, La, Re, Os, Ir, Pt, Ce, and paraperiodic acid ($H_5IO_6$). For example, the $CrO_3$, $CrO_2Cl_2$, $CrO_2(OCOCH_3)$, other tetravalent $Cr^{IV}$, pentavalent $Cr^{V}$, and hexavalent $Cr^{VI}$ compounds ($H_2SO_4$ and $HClO_4$ treatment may enhance the oxidizing power of Cr compounds), $KMnO_4$, other heptavalent $Mn^{VII}$ compounds, $RuO_4$, PT-C, PtO, and $KIO_4$. The compounds may be provided in powder and/or liquid forms, for example, hydrocarbonaceous solutions, colloidal dispersions, or aqueous solutions.

In some embodiments, the compounds of manganese useful herein as oxidants may include, but are not limited to, methyl cyclopentadienyl manganese tricarbonyl, manganese sulfonate, manganese phenate, manganese salicylate, cyclopentadienyl manganese tricarbonyl, alkyl cyclopentadienyl manganese tricarbonyl, organic manganese tricarbonyl derivatives, alkyl cyclopentadienyl manganese derivatives, bis-cyclopentadienyl manganese, bis-alkyl cyclopentandienyl manganese, neutral and overbased manganese salicylates, neutral and overbased manganese phenates, neutral and overbased manganese sulfonates, manganese carboxylates, and combinations and mixtures thereof.

According to one embodiment, a desired manganese oxidant source is methylcyclopentadienyl manganese tricarbonyl, available from Afton Chemical Corporation as MMT® Gasoline Additive, or HiTEC® 3000 Performance Additive, or GREENBURN® Fuel Additive.

In some embodiments, an oxidatively effective amount of a source of manganese added to a fuel or to the combustion air, for example and without limitation, is between about 2 and 200 ppm wt/wt percent manganese in the fuel. In various embodiments, the effective amount of a source of manganese added is between about 5 and 50 ppm wt/wt percent manganese in the fuel. It may be used in burners such as those found in industrial furnaces and utility power generation furnaces. This manganese can be added to the fuel as noted or also directly to the combustion air, or the combustion exhaust gas stream at any time before the combustion exhaust gas reaches the ESP. The treat rate of the additive in the combustion exhaust gas may range between about 0.5 and 3 wt % manganese relative to the weight of the fly ash.

The organic compounds useful herein as mercury oxidants may include for example hydrogen peroxide, organoperoxides, peroxyacids, peroxyesters, and/or organonitrates, and mixtures thereof. For example, the organic compounds may include peracetic acid, peroxytrifluoroacetic acid/boron trifluoride etherate, and/or perbenzoic acid.

The combustion system 100 may also include a controller 190 electrically connected to at least the burners 112, the coal supply 120, the pulverizer 122, the primary air source 124, the secondary air source 128, the auxiliary burner 152, and the injection ports 170. The controller 190 may be operated to control one or more of the elements to which it's electrically connected so as to condition the flyash resulting from the auxiliary furnace 150 to a combustion stage most conducive to a desired (e.g., optimum) activity in mercury capture. The optimum condition may resemble that of commercially-activated carbon in porosity and absorbability, but with lower levels of carbon. As a result, the conditioned flyash from the auxiliary furnace 150 may in one embodiment have a carbon content sufficiently low to avoid the need for a baghouse to remove excessive levels of carbon particles. Moreover, the condition of the flyash from the auxiliary furnace 150 may be highly variable, even to the extent that it may sometimes be nonexistent.

It should be appreciated that the auxiliary burner 152 may be fed with partial-burn coal from the main furnace 110 as an alternative or in addition to being fed coal directly from the pulverizer 122. It should further be appreciated that the combustion system 100 may include a baghouse, a fabric filter, a scrubber, and/or any other device for removing particles from the flue gas, regardless of whether such a device is necessary to remove a sufficient amount of mercury to reduce the mercury level in the flue gas to at least meet a desired level.

The combustion system 100 may be embodied as any and all internal and external combustion devices, machines, boilers, furnaces, incinerators, evaporative burners, stationary burners and the like, for example, power plant generators, power plant furnaces, and the like, in which coal or a coal-containing fuel can be combusted. The term "combustion air" includes ambient or pressurized air or any other oxidant that is combusted with a fuel in a combustion unit. The oxidant may be gaseous or it may be liquid or solid or mixtures or precursors thereof. The combustion air may be additized prior to combustion or otherwise modified to meet or maximize the efficiencies of the combustion unit.

In operation, the pulverizer 122 receives a supply of coal from the coal supply 120 and a primary flow of air from the primary air source 124. A stream of primary air and coal is carried out of the pulverizer 122 and fed via line 126 to the burners 112, where the air/fuel mixture is burned in the combustion zone 114. A slipstream of the primary air and coal is also fed to the auxiliary burner 152 via line 156 and burned in the combustion zone 154. To assist in the burning, a secondary flow of air from the secondary air source 128 may be provided to the burners 112 and/or the auxiliary burner 152. In some embodiments, about 20% of the air required for optimum burning conditions is supplied by the primary air source 124, with the secondary air source 128 providing the remaining air.

In the main furnace 110, each of the burners 112 burns its respective air/fuel mixture in the combustion zone 114. As the burners 112 burn their respective air/fuel mixtures, a gaseous by-product is produced. The gaseous by-product flows in the direction of the arrows A out of the main furnace 110 and into the flue line 132, where the flue gas may be used to heat steam and water in convective passes 144, as is known in the art.

In the auxiliary furnace 150, the auxiliary burner 152 burns its air-fuel mixture in the combustion zone 154. As the auxiliary burner 152 burns its air/fuel mixture, a gaseous by-product including flyash is produced. The flyash is directed to the flue line 132 via line 158. The flyash resulting from the auxiliary furnace may be additized with one or more mercury-active oxidants such as, for example, one or more of the inorganic oxidants, organometallic oxidants, and organic oxidants listed above. As mentioned above, inorganic and organometallic oxidants that are capable of emerging active from a flame front may be introduced to the flame of or upstream of the burner 152 of the main and/or the auxiliary furnace 110, 150. Organic oxidants, which are not flame stable, can be added to the flyash of the auxiliary furnace 150 at an appropriate temperature before the flyash is injected into the flue line 132 or they can be added directly into the flue line 132.

The additized flyash from the auxiliary furnace 150 may provide active oxidation, which facilitates the oxidation of the mercury and subsequent capture of the oxidized mercury by the flyash in the flue gas from the main furnace 110. The mercury-laden flyash may then flow to and be captured by the ESP 130, where it can be dropped into a hopper (not shown) and removed from the combustion system 100. After exiting the ESP 130, the resulting flue gas is directed to the stack 140, where it is exhausted to the atmosphere at 142. In this manner, the total emission of mercury can be dramatically reduced, or completely eliminated, relative to a system not utilizing the stated mercury oxidant(s).

The controller 190 may be selectively operated to control one or more of the elements to which it's electrically connected so as to condition the flyash resulting from the auxiliary furnace 150 to a combustion stage most conducive to a desired (e.g., optimum) activity in mercury capture. For example, the controller 190 may be operated to control the combustion system 110 such that the final level of elemental Hg (Hg$^0$) in the flue gas exhausted from the stack 140 to the atmosphere 142 does not exceed about 7.00 µg/dscm when burning bituminous, sub-bituminous, and/or lignite coal. When burning sub-bituminous coal, the final level of elemental Hg in the flue gas exhausted from the stack 140 in one embodiment does not exceed about 3.00 µg/dscm, and when burning bituminous, the final level of elemental Hg does not exceed about 1.50 µg/dscm. In another embodiment, no detectable mercury would remain in the flue gas exhausted from the stack 140. The present disclosure thereby provides a method for reducing the mercury in flue gas from a coal combustion unit.

It will be apparent to those skilled in the art that various modifications and variations can be made to the exemplary apparatus and method of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A method of removing mercury or mercury-containing material from flue gas produced by a coal-burning main furnace, the method comprising:
   feeding coal which contains mercury or mercury-containing material to a main furnace which produces flue gas;
   feeding the coal to an auxiliary burner which produces a slipstream of flyash,
   feeding the slipstream of flyash from the auxiliary burner into the flue gas produced by the main furnace; and
   introducing a mercury-active oxidant to at least one of the coal being fed to the auxiliary burner, the combustion air being fed to the auxiliary burner, and the flyash, and wherein the mercury-active oxidant comprises a manganese compound selected from the group consisting of methyl cyclopentadienyl manganese tricarbonyl, manganese sulfonate, manganese phenate, manganese salicylate, cyclopentadienyl manganese tricarbonyl, alkyl cyclopentadienyl manganese tricarbonyl, organic manganese tricarbonyl derivatives, alkyl cyclopentadienyl manganese derivatives, bis-cyclopentadienyl manganese, bis-alkyl cyclopentandienyl manganese, neutral and overbased manganese salicylates, neutral and overbased manganese phenates, neutral and overbased manganese sulfonates, manganese carboxylates, and combinations and mixtures thereof.

2. The method of claim 1, wherein the mercury and/or the mercury-containing material is at least partially oxidized by the mercury-active oxidant.

3. The method of claim 2, further comprising removing oxidized mercury or mercury-containing material from the flue gas.

4. The method of claim 3, wherein the oxidized mercury or the mercury-containing material is removed from the flue gas by a means selected from the group consisting of baghouses, electrostatic precipitators, fabric filters, and scrubbers.

5. The method of claim 1, further comprising:
   pulverizing the coal before feeding the coal to the main furnace and the auxiliary burner;
   flowing air to the pulverizer; and
   flowing the air and pulverized coal to at least one of the combustion furnace and the auxiliary burner.

6. The method of claim 1, wherein said feeding the coal to an auxiliary burner comprises at least one of feeding coal directly to the auxiliary burner and feeding partial-burn coal from the main furnace to the auxiliary burner.

7. A system for removing mercury or mercury-containing material from flue gas produced by a coal-burning main furnace, comprising:
   a supply of coal which contains mercury or mercury-containing material;
   a coal-burning main furnace configured to receive coal from the supply of coal and to produce flue gas from combustion of the coal;
   an auxiliary burner configured to receive coal from the supply of coal, generate flyash, and direct the flyash to the flue gas of the main furnace;
   a treatment device configured to introduce a mercury-active oxidant into at least one of the coal being fed to the auxiliary burner, the combustion air being fed to the auxiliary burner, and the flyash,
   wherein the mercury-active oxidant comprises a manganese compound selected from the group consisting of methyl cyclopentadienyl manganese tricarbonyl, manganese sulfonate, manganese phenate, manganese salicylate, cyclopentadienyl manganese tricarbonyl, alkyl cyclopentadienyl manganese tricarbonyl, organic manganese tricarbonyl derivatives, alkyl cyclopentadienyl manganese derivatives, bis-cyclopentadienyl manganese, bis-alkyl cyclopentandienyl manganese, neutral and overbased manganese salicylates, neutral and overbased manganese phenates, neutral and overbased manganese sulfonates, manganese carboxylates, and combinations and mixtures thereof.

8. The system of claim 7, wherein the mercury and/or the mercury-containing material is at least partially oxidized by the mercury-active oxidant.

9. The system of claim 8, further comprising at least one of an electrostatic precipitator, a baghouse, a fabric filter, and a scrubber configured to remove oxidized mercury from the flue gas.

10. The system of claim 7, further comprising:
    a pulverizer configured to pulverize the coal before the coal is feed to the main furnace and the auxiliary burner;
    a primary air source configured to flow air to the pulverizer and to flow the air and pulverized coal to at least one of the combustion furnace and the auxiliary burner.

11. The system of claim 7, wherein the coal is fed from the supply of coal directly to the auxiliary burner.

12. The system of claim 7, wherein the coal is indirectly fed to the auxiliary burner by feeding coal from the supply of coal to the main furnace and feeding partial-burn coal from the main furnace to the auxiliary burner.

13. A method of removing mercury or mercury-containing material from flue gas produced by a coal-burning main furnace, the method comprising:
    feeding coal to an auxiliary burner which produces a slipstream of flyash;
    generating a slipstream of flyash from the auxiliary burner;
    feeding the slipstream of flyash into flue gas produced by the main furnace; and
    introducing a mercury-active oxidant into at least one of the coal being fed to the auxiliary burner, the combustion air being fed to the auxiliary burner, and the flyash, and wherein the mercury-active oxidant comprises a manganese compound selected from the group consisting of methyl cyclopentadienyl manganese tricarbonyl, manganese sulfonate, manganese phenate, manganese salicylate, cyclopentadienyl manganese tricarbonyl, alkyl cyclopentadienyl manganese tricarbonyl, organic manganese tricarbonyl derivatives, alkyl cyclopentadienyl manganese derivatives, bis-cyclopentadienyl manganese, bis-alkyl cyclopentandienyl manganese, neutral and overbased manganese salicylates, neutral and overbased manganese phenates, neutral and overbased manganese sulfonates, manganese carboxylates, and combinations and mixtures thereof.

14. The method of claim 13, wherein the mercury and/or mercury-containing material is at least partially oxidized by the mercury oxidant.

15. The method of claim 14, further comprising removing oxidized mercury or mercury-containing material from the flue gas.

16. The method of claim 15, wherein the oxidized mercury or the mercury-containing material is removed from the flue gas by a means selected from the group consisting of baghouses, electrostatic precipitators, fabric filters, and scrubbers.

17. The method of claim 13, wherein said feeding the coal to an auxiliary burner comprises at least one of feeding pulverized coal directly to the auxiliary burner and feeding partial-burn pulverized coal from the main furnace to the auxiliary burner.

* * * * *